US007616779B2

(12) United States Patent
Liao et al.

(10) Patent No.: US 7,616,779 B2
(45) Date of Patent: Nov. 10, 2009

(54) METHOD FOR AUTOMATIC KEY POSTURE INFORMATION ABSTRACTION

(75) Inventors: Hong-Yuan Liao, Taipei (TW); Duan-Yu Chen, Taipei (TW)

(73) Assignee: National Chiao Tung University, Hsinchu (TW)

( * ) Notice: Subject to any disclaimer, the term of this patent is extended or adjusted under 35 U.S.C. 154(b) by 722 days.

(21) Appl. No.: 11/269,614

(22) Filed: Nov. 9, 2005

(65) Prior Publication Data

US 2007/0104373 A1  May 10, 2007

(51) Int. Cl.
*G06K 9/00* (2006.01)
(52) U.S. Cl. .................................. 382/103; 382/203
(58) Field of Classification Search ............. 382/103, 382/203, 217, 243; 348/77, 169, 422.1, 700
See application file for complete search history.

(56) References Cited

U.S. PATENT DOCUMENTS

| 6,782,049 B1 * | 8/2004 | Dufaux et al. | 375/240.01 |
| 6,993,462 B1 * | 1/2006 | Pavlović et al. | 703/2 |
| 2003/0058339 A1 * | 3/2003 | Trajkovic et al. | 348/155 |
| 2004/0091153 A1 * | 5/2004 | Nakano et al. | 382/228 |
| 2004/0190776 A1 * | 9/2004 | Higaki et al. | 382/190 |

OTHER PUBLICATIONS

I. Haritaoglu, D. Hardwood, and L. Davis, "Ghost: A Human Body Part Labeling System Using Silhouettes," in Proc. Int. Conf. Pattern Recognition, vol. 1, pp. 77-82, 1998.
A.F. Bobick and J.W. Davis, "The Recognition of Human Movement Using Temporal Templates," IEEE Trans. On Pattern Analysis and Machine Intelligence, vol. 23, No. 3, Mar. 2001.
B. Boulay, F. Bremond and M. Thonnat, "Human Posture Recognition in Video Sequence," in Proc. IEEE Workshop on Visual Surveillance and Performance Evaluation of Tracking and Surveillance, pp. 23-29, 2003.
T. Zhao, R. Nevatia and F. Lu, "Segmentation and Tracking of Multiple Humans in Complex Situations," in Proc. IEEE Int. Conf. On Computer Vision and Pattern Recognition, vol. 2, pp. 08-12, 2001.

* cited by examiner

*Primary Examiner*—Andrew W Johns
(74) *Attorney, Agent, or Firm*—Bacon & Thomas, PLLC

(57) ABSTRACT

The method for automatic key posture information abstraction of this invention comprises the steps of: Abstracting from a series of continuous digitized images spatial features of objects contained in said images; abstracting shape features of said objects using a method of probability calculation; detecting key posture information contained in said series of continuous images using a method of entropy calculation; removing redundant key postures; mating obtained key postures with key posture templates stored in a codebook; and encoding mated key postures.

12 Claims, 5 Drawing Sheets

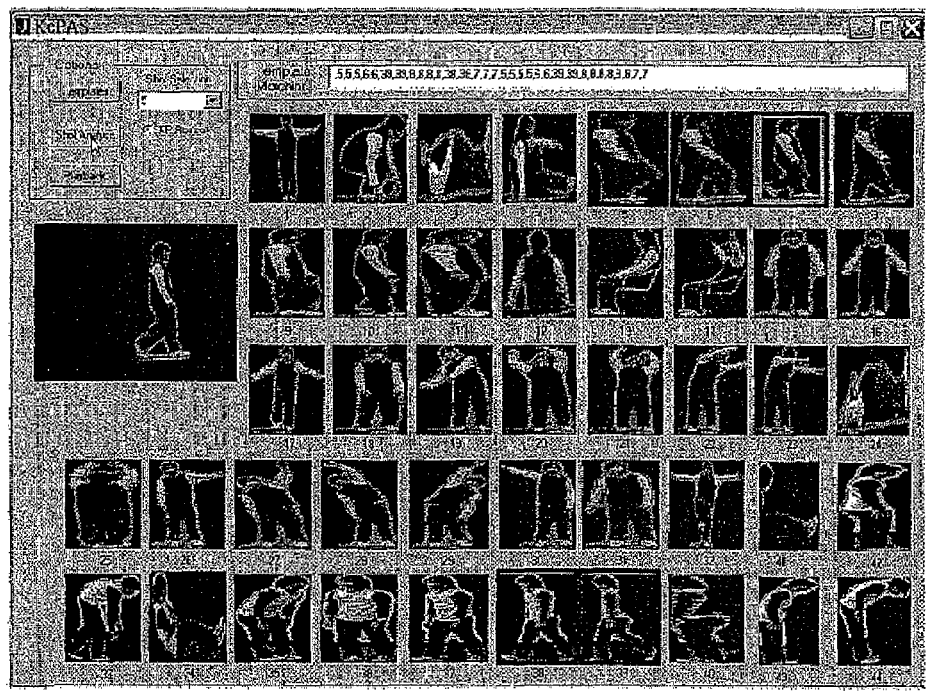
Fig. 7
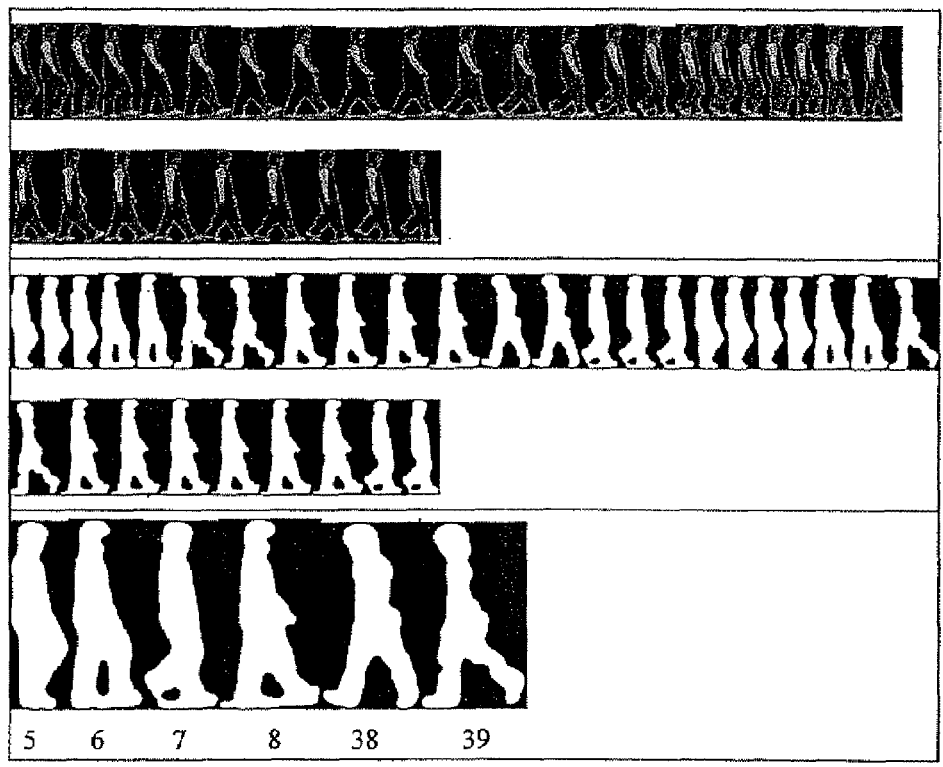
Fig. 8(a)
Fig. 8(b)
Fig. 8(c)

METHOD FOR AUTOMATIC KEY POSTURE INFORMATION ABSTRACTION

FIELD OF THE INVENTION

The present invention relates to a computerized image processing system, especially to a method of automatically analyzing images of a digitized image file and abstracting information representing key postures of human behavior from said images.

BACKGROUND OF THE INVENTION

Human posture analysis is one of the most important steps towards successful analysis of information representing human behavior contained in a video file. The difficulty of human posture analysis is twofold. First, the movement of a human body is represented by an articulated motion in the digitized video file. Therefore, to define a "key posture" in a digital image is a problem with high dimensionality and complexity. Second, characterization of human behavior is equivalent to dealing with a sequence of video frames that contain both spatial and temporal information. The most challenging issue is how to properly characterize spatial-temporal information and then facilitate subsequent comparison/retrieval tasks.

The posture analysis systems in the conventional art can be categorized into two classes, i.e., the 2-dimensional based and 3-dimensional based approaches. Amongst the 2-dimensional approaches, Haritaoglu et al. proposed a W4 (what, where, when and who) system that computed the vertical and horizontal projections of a silhouette to determine the global posture of a person, such as standing, sitting, bending and lying. See I. Haritaoglu, D. Harwood, and L. Davis, "Ghost: A Human Body Part Labeling System Using Silhouettes," in Proc. Int. Conf. Pattern Recognition, Vol. 1, pp. 77-82, 1998.

Bobick and Davis proposed a temporal template built by stacking a set of consecutive frames. The proposed temporal template characterized human motion by using motion energy images (MEI) and motion intensity images (MHI). Moment based features were extracted from MEI and MHI and they used these moment based features to conduct template matching. See A. F. Bobick and J. W. Davis, "The Recognition of Human Movement Using Temporal Templates," IEEE Trans. on Pattern Analysis and Machine Intelligence, Vol. 23, no 3, March 2001.

Among the 3-dimensional approaches, Boulay et al. first computed projections of moving pixels on a reference axis and learned 2-D posture appearances through PCA (principal component analysis). Then, they employed a 3-D model of posture to make the projection-based method independent of the camera position. See B. Boulay, F. Bremond, and M. Thonnat, "Human Posture Recognition in Video Sequence," in Proc. IEEE Workshop on Visual Surveillance and Performance Evaluation of Tracking and Surveillance, pp. 23-29, 2003.

Zhao et al. used a 3-D human model to verify whether a moving region detected represents a person or not. The verification process was done by walking recognition using an articulated human walking model. See T. Zhao, R. Nevatia and F. Lu, "Segmentation and Tracking of Multiple Humans in Complex Situations," in Proc. IEEE Int. Conf. on Computer Vision and Pattern Recognition, Vol. 2, pp. 08-12, 2001. However, due to the complexity in computation and high costs of the 3-D approach, there is still no 3-D key posture analysis system commercially available.

In order to provide an automatic and effective key posture analysis system for digitalized images, it is necessary to identify the significant postures of a human behavior recorded in a video sequence systematically and automatically. However, in the previous researches no such automatic key posture analysis and selection methods were disclosed.

OBJECTIVES OF THE INVENTION

The objective of this invention is to provide a systematic method for automatically abstract for further processing key posture information from a sequence of digital images.

Another objective of this invention is to provide an efficient method for automatic key posture information abstraction.

Another objective of this invention is to provide a simplified method for automatic key posture information abstraction.

Another objective of this invention is to provide a low cost method for automatic key posture information abstraction.

Anther objective of this invention is to provide a system for automatic key posture information abstraction.

SUMMARY OF THE INVENTION

According to this invention, the method for automatic key posture information abstraction comprises the following steps: Abstracting from a series of continuous digitized images spatial features of objects contained in said images; abstracting shape features of said objects using a method of probability calculation; detecting key posture information contained in said series of continuous images using a method of entropy calculation; removing redundant key postures; mating obtained key postures with key posture templates stored in a codebook; and encoding mated key postures.

These and other objectives and advantages of this invention may be clearly understood from the detailed description by referring to the following drawings.

BRIEF DESCRIPTION OF THE DRAWINGS

FIG. 7 illustrates the set of 44 key postures extracted from the original video.

FIG. 8(a) shows the complete sequence of the walking process. FIG. 8(b) shows the sequence of the matched key postures. Note that the first three frames matched key posture #5 and the fourth and fifth frames of the walking sequence matched key posture #6. FIG. 8(c) shows only 6 key postures (#5, #6, #7, #8, #38, #39) mated from the key posture matching process if the walking sequence shown in FIG. 8(a) was adopted.

FIG. 9 shows the encoding of a lying-to-standup sequence, wherein

DETAILED DESCRIPTION OF THE INVENTION

Although it is not intended to limit the scope of this invention to any theory, it is generally accepted that a sequence of digital image frames may be used to record human behavior within a certain period of time. However, due to the large quantity of data rest in those digital images, it is not feasible to use the computer system to recognize and abstract features of the human behavior from the images frame by frame. A feasible approach for analyzing human behavior information contained in the sequence image is to establish templates of key postures or feature postures of human body and to match or mate these templates with key postures or feature postures contained in the sequence image. In establishing the templates, some conditions shall be satisfied. They are: There must be enough types or kinds of templates to describe most postures of human body. Number of types or kinds of templates must not be too great to create the problem of redundancy and to slow down the after processing.

In order to select suited key postures from a sequence image, in the present invention the value of "difference of cumulative entropy" of the images is used as standard of selecting key postures from a video file recorded with human behavior. Entropy values of the selected key postures are then cross compared to remove redundant key postures. Suited key postures are then selected and are matched with template key postures contained in a codebook. The mated key postures are encoded so to obtain a sequence or series of continuous codes, representing sequential key postures of a human behavior. Processing efficiency and accuracy are thus enhanced.

Figure 1:
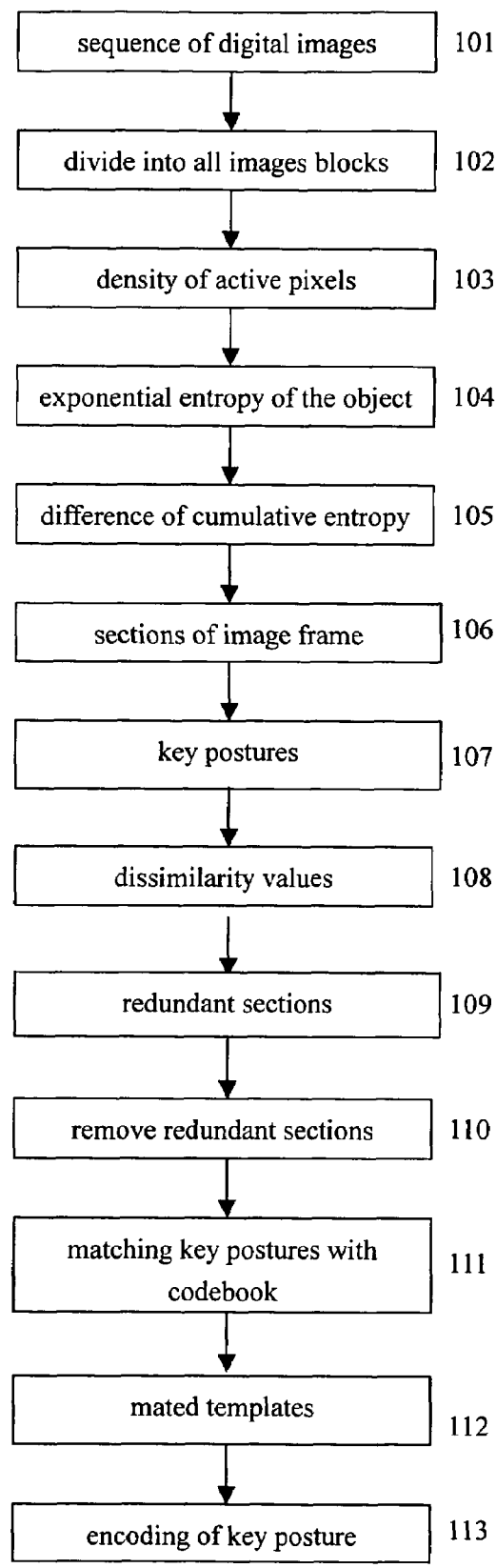
FIG. 1 illustrates the flowchart of one embodiment of the method for automatic key posture information abstraction of this invention.

Detailed description of embodiments of the method for automatic key posture information abstraction of this invention will be given hereinafter, referring to the figures. FIG. 1 illustrates the flowchart of one embodiment of the method for automatic key posture information abstraction of this invention. As shown in this figure, the method for automatic key posture information abstraction of this invention included the following steps: Abstracting from a series of continuous digitized images spatial features of objects contained in said images; abstracting shape features of said objects using a method of probability calculation; detecting key posture information contained in said series of continuous images using a method of entropy calculation; removing redundant key postures; mating obtained key postures with key posture templates stored in a codebook; and encoding mated key postures.

In the following detailed description, several embodiments of this invention will be shown. However, these embodiments are used to illustrate the possible implementations of the invention and shall not be used to limit the scope of this invention.

Refer to FIG. 1. In using the method for automatic key posture information abstraction of this invention to abstract key posture information from a sequence of image frames, at first at 101 a digital image file is obtained. The image file contains a plurality of continuous digitalized image frames. At 102 every image frame is divided into a plurality of blocks. At 103 the density of active pixels residing in each block is calculated. Here, the term "active pixels" means pixels representing targeted object (human body in this embodiment) in the image frame.

Figure 2:
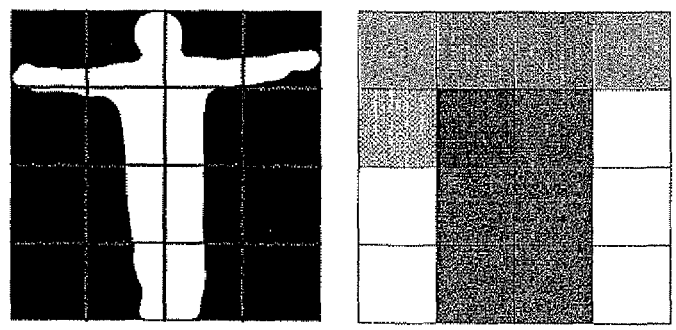
FIG. 2 shows a rectangle containing the image of a human body and blocks in said rectangle.

In the embodiment of this invention, not all areas of the image frame are processed. For example, it is possible to use a known image analysis technology such as background subtraction to detect objects contained in an image frame. By calculating the aspect ratio of the object, it is possible to allocate blocks surrounding the objects. Suppose blocks surrounding one object reside in a rectangular region has h*w blocks, wherein h represents number of block in the height direction and w represents number of block in the width direction, both in the rectangle, as shown in FIG. 2. FIG. 2 shows a rectangle containing the image of a human body. Density of active pixels in block i, $p_i$, may be calculated by: $p_i = N_i/N$, wherein $N_i$ represents number of active pixels in the ith block and N represents total number of pixels of the block, assuming every block has the same number of pixels.

Then at 104 the exponential entropy of the object in the image frames is calculated. The "exponential entropy" H of the image object may be defined as:

$$H(t) = \sum_{i=1}^{h \times w} p_i \exp(1 - p_i)$$

wherein t represents the sequence number of the block.

In order to enhance the processing efficiency to realize real-time processing, it is necessary to provide a filtering mechanism to remove redundant image frames. Although it is again not intended to limit the scope of this invention, it was found that when number of blocks containing "connected components" is greater, entropy value of the image frame containing the blocks will be greater. Here, the term "connected component" means active pixels connected with other active pixels. In fact, number of blocks containing connected elements is approximately in ratio to entropy of image frame containing said blocks. The entropy value of a frame may be used to determine characters of the image frame.

In the present invention, features of an image frame are abstracted according to its entropy value, or exponential entropy value. The distance between two consecutive images is defined as difference in entropy value of two image frames, as follows:

$$D_{posture}(t, t-1) = |H(t) - H(t-1)|$$

wherein t and t−1 represent sequential numbers of image, image frame or key posture in the sequence image frame.

Following the above definitions, a "key posture" is thus defined as: When the difference of cumulative entropy value of any section of image frame and its preceding section of image frame is greater than a threshold value, blocks containing image object (human body) in the section are deemed a key posture. The "difference of cumulative entropy value" $C(P_P, P_Q)$ may be calculated according to the following formula:

$$C(P_P, P_Q) = \sum_{t=P}^{Q-1} D_{posture}(t, t-1)$$

wherein $P_P$ and $P_Q$ represent sections of image frames counting from the Pth and Qth frames, respectively; P<Q.

Therefore, at 105 the difference of cumulative entropy values of sections of image frame $P_P$ and $P_Q$, $C(P_P, P_Q)$ is calculated according to the above formula. At 106 sections of image frame representing key postures are selected, when the difference of cumulative entropy value is greater than a threshold value. At 107 an image frame of each section is selected to represent a key posture. In the embodiment of this invention, the first image frame of each section is selected as representative. Of course, it is possible to select any other image frame or the combination of several image frames as representative of key postures.

Figure 3:
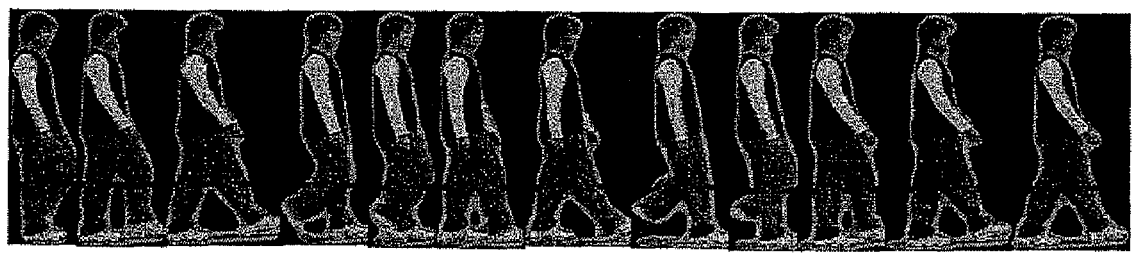
FIG. 3 shows 18 images selected from 200 sequential image frames according to the present invention.
Figure 3:
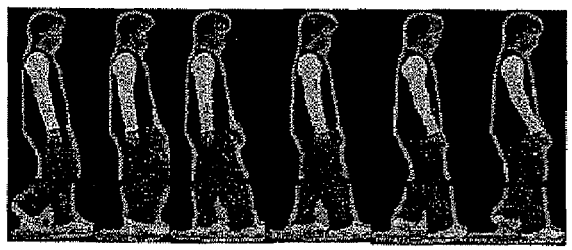
Figure 4:
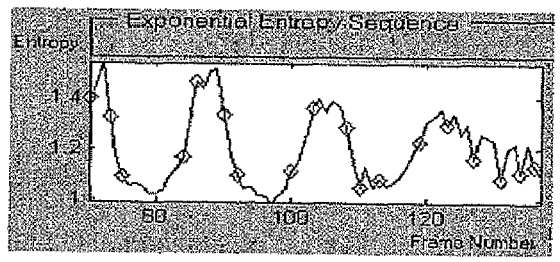
FIG. 4 shows cumulative entropy values of the image frames of FIG. 3.

In the application, it is also possible to select a predetermined image as candidate of key posture and start calculate cumulative entropy value of a section of image frame from that image frame. When the difference of cumulative entropy value is greater than the threshold value, the then current image frame may be selected as second candidate. And so on, until all image frames are processed. Such approach is beneficial for real-time processing. FIG. 3 shows 18 images selected from 200 sequential image frames according to the present invention. FIG. 4 shows cumulative entropy values of these image frames. In this figure, the X axis represents difference of cumulative entropy and Y axis parameter of the image.

Images selected according to the proceeding method contain redundant images. They would cause wastes in the processing time and resources. In order to remove these redundant images, a filter is provided in this invention. In filtering out the redundant images, the dissimilarity values of each pair of section are calculated, as follows:

$$d(P_P, P_Q) = \sum_{i=1}^{h \times w} P_P(i) \exp(P_P(i) - P_Q(i)) + \sum_{i=1}^{h \times w} P_Q(i) \exp(P_Q(i) - P_P(i))$$

wherein $d(P_P, P_Q)$ represents dissimilarity value between two image frames $P_P$ and $P_Q$, representing sections of image frames starting from $P_P$ and $P_Q$, respectively; and $P_P(i)$ and $P_Q(i)$ represent density of active pixels in the ith image block in the image frames.

In application, $P_P$ and $P_Q$ are image frames with background being removed. Therefore, only components representing human body are left. In calculating the dissimilarity values, dissimilarity between any two selected sections is calculated. When number of block in $P_P$ and $P_Q$ is not identical, the aspect ratio of $P_P$ and $P_Q$ may be used to adjust.

At 108 the dissimilarity values of the sequence image frame are calculated. At 109 sections of image frame with dissimilarity values greater than a threshold value are determined as redundant sections and are removed at 110.

Figure 5:
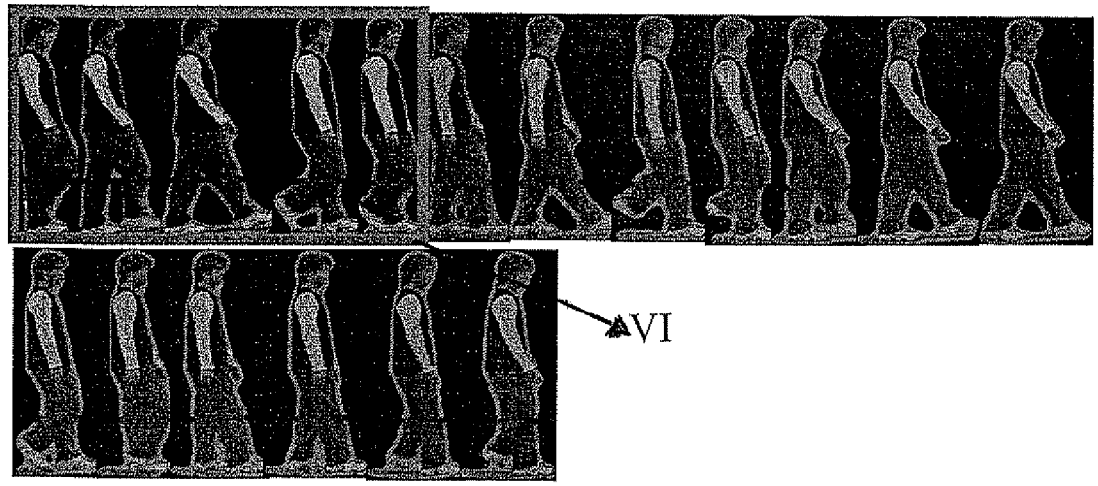
FIG. 5 shows results of redundancy removing according to this invention.
Figure 6:
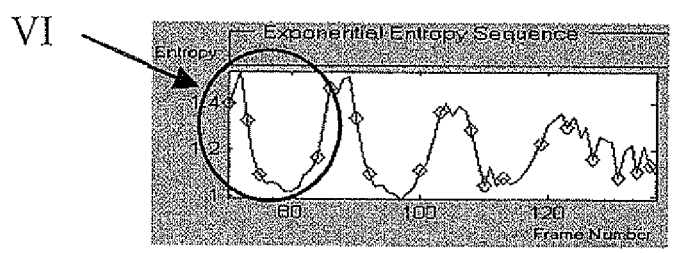
FIG. 6 shows values of difference of exponential entropy of images being processed for redundancy removing.

FIG. 5 shows results of redundancy removing according to this invention. In the figure, images with bold frames are residual images that represent key postures. Values of difference of exponential entropy are shown in FIG. 6 with the highlighted area indicated by arrow VI in the image sequence of FIG. 5 corresponding to the circled area indicated by arrow VI in the entropy chart of FIG. 6.

After the processing, images representing key posture are compared with templates stored in a code book of key postures at 111. In comparing a selected key posture and a template, their dissimilarity is calculated as follows:

$$d(Q, T) = \sum_{i=1}^{h \times w} Q(i) \exp(Q(i) - T(i)) + \sum_{i=1}^{h \times w} T(i) \exp(T(i) - Q(i))$$

wherein Q represents a selected key posture image, T represents a template key posture image, Q(i) and T(i) represent density of active pixels in block in images Q and T, respectively.

After values of dissimilarity value are obtained, at 112 template with the lowest dissimilarity is selected as mated. At 113 code representing the mated template is given to the key posture image. Encoding of the key posture is thus complete.

After the preceding process, all selected key postures are given a code. The sequence image frame is thus given a series of key posture codes. The series key posture code may then be compared with series codes representing human behaviors. By calculating similarity of the series codes, it is possible to determine what human behavior the sequence image frame represents automatically.

EMBODIMENT

A real video sequence consisted of 33 shots (6100 frames) is used to abstract key postures. Using the invented exponential entropy and cross entropy measure 44 key postures were selected from the original 6100 frames. FIG. 7 illustrates the set of 44 key postures extracted from the original video. The upper-left of FIG. 7 shows an instance of a walking person. The posture corresponding to this walking person at this instance is shown as key posture #7 (highlighted by a bold rectangle). The top of FIG. 7 illustrates a sequence of numbers indicating how the posture of the walking person evolved during the walking sequence. FIG. 8(a) shows the complete sequence of the walking process. FIG. 8(b) shows the sequence of the matched key postures. Note that the first three frames matched key posture #5 and the fourth and fifth frames of the walking sequence matched key posture #6. FIG. 8(c) shows only 6 key postures (#5, #6, #7, #8, #38, #39) mated from the key posture matching process if the walking sequence shown in FIG. 8(a) was adopted. Using the encoded sequence shown on the top of FIG. 7, one can encode a continuous sequence of action easily.

Figures 9A, 9B, 9C:
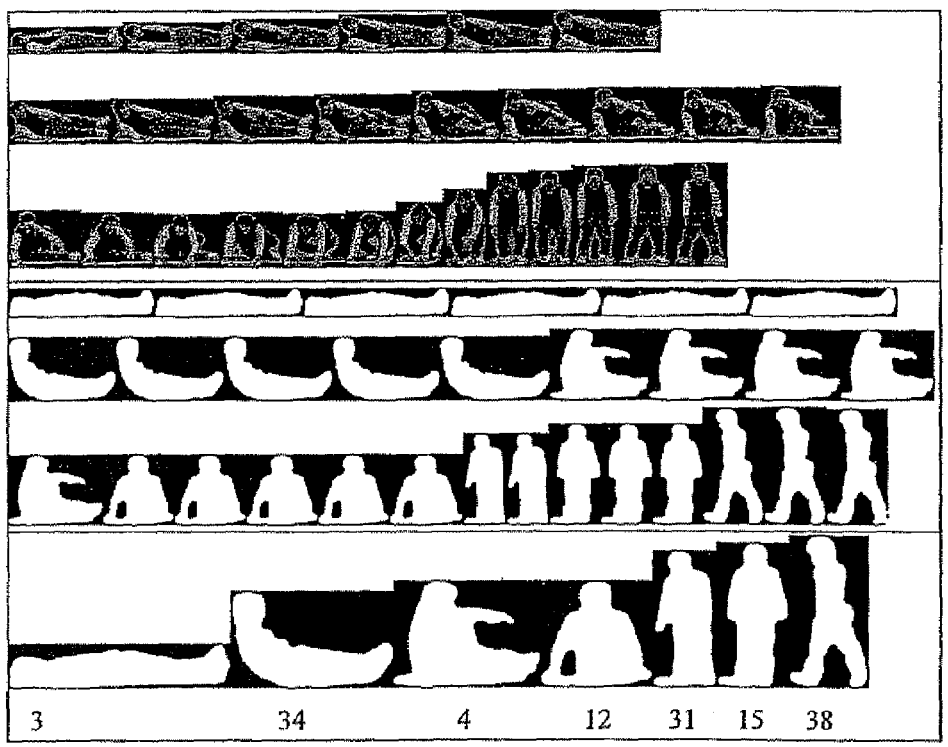
FIG. 9(a) shows images of the whole human action process from lying to stand up.
FIG. 9(b) shows the corresponding matched key postures.
FIG. 9(c) shows the encoded key postures.

FIG. 9 shows the encoding of a lying-to-standup sequence. FIG. 9(a) shows images of the whole human action process from lying to stand up. FIG. 9(b) shows the corresponding matched key postures. FIG. 9(c) shows the encoded key postures.

As the present invention has been shown and described with reference to preferred embodiments thereof, those skilled in the art will recognize that the above and other changes may be made therein without departing from the spirit and scope of the invention.

What is claimed is:

1. Method for using a computer system to automatically select key postures from a sequence of continuous image frames and abstract said key postures, said image frames depicting a human whose behavior is to be analyzed, comprising the steps of:

said computer system abstracting from a series of continuous digitized images spatial features of objects contained in said images;

said computer system abstracting shape features of said objects using probability calculation;

said computer system detecting key posture information contained in said series of continuous images using entropy calculation;

said computer system removing redundant key postures from said detected key posture information in order to obtain selected key postures;

said computer system mating said selected key postures with key posture templates stored in a codebook to obtain mated postures;

said computer system encoding said mated key postures to obtain series key posture codes; and said computer system comparing said series key posture codes with series codes representing human behaviors to provide an indication of what human behavior the sequence of continuous image frames depicts.

2. Method according to claim 1, wherein said abstraction of spatial features comprising the steps of:

obtaining a series of continuous digitized images;

dividing each images into blocks; and calculating density of active pixels in each block of said images;

wherein said active pixels are pixels representing said objects contained in said images.

3. Method according to claim 2, wherein said step of abstracting shape features of said objects comprises obtaining entropy values of blocks surrounding said objects as shape features of said objects.

4. Method according to claim 3, wherein said entropy value comprises exponential entropy value.

5. Method according to claim 2, wherein when difference of cumulative entropy value of a section of continuous images and that of a preceding section of continuous images is greater than a threshold value, blocks containing one of said objects in images of said section are deemed a detected key posture and wherein said difference of cumulative entropy value is calculated according to the following formula:

$$C(P_P, P_Q) = \sum_{t=P}^{Q-1} D_{posture}(t, t-1)$$

wherein $P_p$ and $P_Q$ represent sections of continuous images counting from the Pth and Qth images, respectively; P<Q; wherein $$D_{posture}(t, t-1) = |H(t-)|$$

wherein t and t−1 represent sequential numbers of image, image frame or key posture in the sequence image frame; and wherein $$H(t) = \sum_{i=1}^{h \times w} p_i \exp(1 - p_i)$$

wherein $p_i$ represents density of active pixels, $p_i = N_i/N$; $N_i$ represents number of active pixels in the ith block that surrounds said object in said image and N represents total number of pixels in said block.

6. Method according to claim 1, wherein entropy of an image is calculated according to the following formula:

$$H(t) = \sum_{i=1}^{h \times w} p_i \exp(1 - p_i).$$

7. Method according to claim 1, wherein said step of detecting key posture information comprises the steps of:

selecting randomly an image in said sequence as first candidate of key posture;

calculating cumulative exponential entropy value of images beginning from said selected image;

when said cumulative exponential entropy value is greater than a threshold value, selecting then current image as image containing second key posture; and repeating the preceding operation until all images are processed.

8. Method according to claim 1, wherein said step of removing redundant key postures comprises the steps of:

calculating dissimilarity values $d(P_P, P_Q)$ of every two adjacent images;

selecting sections of continuous images starting from an image having dissimilarity value greater than a threshold value as redundant section of images; and removing said redundant section of images from said sequence.

9. Method according claim 8, wherein said dissimilarity value $d(P_P, P_Q)$ is calculated according to the following formula:

$$d(P_P, P_Q) = \sum_{i=1}^{h \times w} P_P(i) \exp(P_P(i) - P_Q(i)) + \sum_{i=1}^{h \times w} P_Q(i) \exp(P_Q(i) - P_P(i))$$

wherein $P_P$ and $P_Q$ are two images, representing sections of images starting from $P_P$ and $P_Q$, respectively, $P_P(i)$ and $P_Q(i)$ represent density of active pixels in the ith image block in the images.

10. Method according to claim 1, wherein said step of mating of obtained key postures comprises the steps of:

calculating dissimilarity values of an image representing a key posture and templates of key posture stored in a database; and selecting a template with least dissimilarity value as mated key posture of said image.

11. Method according to claim 10, wherein said dissimilarity value D is calculated according to the following formula:

$$d(Q, T) = \sum_{i=1}^{h \times w} Q(i) \exp(Q(i) - T(i)) + \sum_{i=1}^{h \times w} T(i) \exp(T(i) - Q(i))$$

wherein Q represents said image, T represents a template key posture image, Q(i) and T(i) represent density of active pixels in block in images Q and T, respectively.

12. Method according to claim 10, further comprising the step of mating a series of codes so encoded with a plurality of series of codes representing particular type of human behavior to determine whether said obtained series of codes represents a human behavior and type of human behavior thereof.

* * * * *

UNITED STATES PATENT AND TRADEMARK OFFICE
CERTIFICATE OF CORRECTION

PATENT NO. : 7,616,779 B2  Page 1 of 1
APPLICATION NO. : 11/269614
DATED : November 10, 2009
INVENTOR(S) : Liao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this

Nineteenth Day of October, 2010

David J. Kappos
*Director of the United States Patent and Trademark Office*